United States Patent
Horita et al.

[11] Patent Number: 5,923,165
[45] Date of Patent: Jul. 13, 1999

[54] METHOD AND APPARATUS FOR DETECTING BROKEN SEWING NEEDLES IN SEWN ARTICLES

[75] Inventors: Hiromitsu Horita; Koichi Kawakami, both of Toyama; Noriaki Kazama, Sendai; Tsuneo Suzuki; Shinichi Kojima, both of Kurobe, all of Japan

[73] Assignee: YKK Corporation, Tokyo, Japan

[21] Appl. No.: 08/848,491

[22] Filed: May 8, 1997

[30] Foreign Application Priority Data

May 10, 1996 [JP] Japan ..................................... 8-139728
Feb. 28, 1997 [JP] Japan ..................................... 9-060182

[51] Int. Cl.$^6$ .......................... G01N 27/72; G01R 33/12; D06H 3/14; G01U 3/00
[52] U.S. Cl. .......................... 324/239; 324/226; 209/567
[58] Field of Search ..................................... 324/226, 236, 324/234, 239, 243; 209/567; 66/1 R; 112/1

[56] References Cited

U.S. PATENT DOCUMENTS 4,734,643  3/1988  Bubenik et al. ..................... 324/226

FOREIGN PATENT DOCUMENTS

56-36049  4/1981  Japan .
4-82958   3/1992  Japan .

*Primary Examiner*—Walter E. Snow
*Attorney, Agent, or Firm*—Hill & Simpson

[57] ABSTRACT

Disclosed are a method and apparatus for detection of a magnetic substance erroneously included in a non-magnetic product. The non-magnetic product such as a sewn product is passed through a high magnetic field in which a magnetic field is applied to the product. The residual magnetization of a magnetic substance such as a broken needle mingled in the product is detected by a sensing unit and a signal of detection is transmitted to a measuring unit to measure the magnitude of detected residual magnetization. The presence or absence of the magnetic substance in the product is determined by a control unit based on the output from the measuring unit. Alternatively, a magnetic field may be preparatorily applied to a magnetic substance having the possibility of being mingled in the non-magnetic product thereby causing the magnetic substance to assume a state of possessing residual magnetization.

10 Claims, 7 Drawing Sheets

METHOD AND APPARATUS FOR DETECTING BROKEN SEWING NEEDLES IN SEWN ARTICLES

BACKGROUND OF THE INVENTION

1. Field of the Invention

This invention relates to a method and apparatus for easily and reliably effecting detection of magnetic substances such as metallic pieces which have been erroneously incorporated in various non-magnetic products such as sewn products, woven and/or knitted products, non-woven fabrics, carpets, tatamis (straw matting), foods, and medical products, particularly broken needles which have been erroneously mingled in sewn products in the sewing process.

2. Description of the Prior Art

The possibility that magnetic substances such as metallic pieces will erroneously enter such various products as mentioned above during or after the course of manufacture is undeniable. When the sewing needles attached to sewing machines are broken or the pins are mislaid, they will possibly enter sewn products after the sewing process. When fasteners are sewn to garments, the possibility exists that the leading ends of sewing needles of sewing machines will break off and disappear in the seems between fasteners and garments. The products holding this possibility, therefore, must be deprived of metallic pieces such as lost needles before they are shipped. Now that the liabilities on the part of producers have been growing particularly since the enforcement of the law concerning the products liability, the problem of the entry of broken needles such as is incurred during the course of sewing fasteners to garments has been gaining in seriousness.

Heretofore, the detection of lost needles such as broken needles has been attained by utilizing the fact that a magnetic field is disturbed when a magnetic substance crosses the magnetic field as disclosed in published Japanese Patent Application, KOKAI (Early Publication) No. 4-82,958 and No. 56-36,049, for example. To be specific, when a detection coil is disposed in a magnetic field and a sewn product containing a magnetic substance erroneously incorporated therein is passed through the magnetic field, the magnetic field is disturbed owing to the presence of the magnetic substance and this disturbance of the magnetic field induces a difference in the induced current generated in the detection coil. Since this difference in the induced current is extremely feeble, it is amplified to a prescribed level to permit the detection of the magnetic substance.

In the case of a method for detecting a magnetic substance by utilizing the disturbance of a magnetic field mentioned above, even when a metallic piece which is not a magnetic substance adheres to a sewn product and it happens to have a certain size, this metallic piece never fails to affect the magnetic field and form a cause for mistaken detection. In the case of a fastener to which an aluminum slider or a die-cast zinc slider is attached or a sewn product to which such a fastener is sewn, the fastener or the sewn product, when passing the magnetic field, affects the magnetic field. Then, the apparatus for detecting lost needles fails to discern whether the detected disturbance in the magnetic field (induced current) has been caused by a magnetic substance (needle) mingled in the sewn product or by the slider and forms an erroneous judgement that the sewn product contains a magnetic substance (needle) notwithstanding it is not containing one.

The possible effect of an external noise on the detection cannot be ignored because the difference of the induced current which is generated in the detection coil by the disturbance of the magnetic field is extremely feeble. Since the magnetic substance generates no difference in the induced current flowing through the detection coil unless this magnetic substance is moved, the apparatus is incapable of discriminating whether or not the magnetic substance (needle) is included in a sewn product under test when the sewn product containing the magnetic substance (needle) is transferred at a low speed or it is kept at a stopped state. Conversely, when sewn products are transferred at a high speed, the apparatus incurs difficulty in selecting only the sewn products that are containing magnetic substances (needles).

SUMMARY OF THE INVENTION

An object of the present invention, therefore, is to provide a method for easily and reliably detecting magnetic substances erroneously included in such various non-magnetic products as mentioned above, particularly broken needles contained erroneously in sewn products, and an apparatus for the detection.

Another object of the present invention is to provide a detecting method and an apparatus for the detection which are capable of detecting magnetic substances included in the products even when the products have sewn thereto fasteners or other articles which affect a magnetic field or when they are being conveyed or being kept at a stopped state.

To accomplish the objects mentioned above, the first aspect of the present invention resides in providing a method for detecting magnetic substances in non-magnetic products. The first embodiment of the invention concerns a method for the detection of a magnetic substance included in a non-magnetic product, characterized by applying to the product a magnetic field, preferably the magnetic field of intensity equivalent to or greater than that required for imparting saturated magnetization thereto, then detecting residual magnetization of the magnetic substance included in the product, and judging or determining the presence or absence of the magnetic substance in the product on the basis of the detected residual magnetization.

The second embodiment of the invention concerns a method for the detection of a magnetic substance included in a non-magnetic product, characterized by preparatorily applying a magnetic field, preferably the magnetic field of intensity equivalent to or greater than that required for imparting saturated magnetization, to a magnetic substance having the possibility of mingling in the non-magnetic product thereby causing the magnetic substance to assume a state of possessing residual magnetization, then detecting the residual magnetization of the magnetic substance included in the product, and judging or determining the presence or absence of the magnetic substance in the product based on the detected residual magnetization.

In either of the embodiments mentioned above, the detection of the residual magnetization of a magnetic substance such as a metallic piece or a needle which is mingled with a non-magnetic product may be properly attained by arranging a plurality of magnetic sensors as spaced at intervals of a prescribed size in the direction of width of the non-magnetic product and moving the magnetic sensors relative to the non-magnetic product. The relative movement of the non-magnetic product and the magnetic sensors can be accomplished by moving (imparting a scanning motion to) the magnetic sensors. In consideration of the adaptability of the apparatus under discussion to the existing production line and the workability thereof, however, it is desirable that the residual magnetization of the magnetic substance included in the non-magnetic product be detected, while moving the non-magnetic product, by the plurality of magnetic sensors opposed across a prescribed distance to the product in motion and arranged and fixed at intervals of a prescribed size in a direction substantially perpendicular to the direction of the movement of the non-magnetic product. When the non-magnetic product happens to be a sewn article, for example, the detection of the residual magnetization of a needle included in the sewn product may be attained by a measure which comprises magnetizing the needle to be used in the sewing work and subjecting the product sewn with the magnetized needle to the scanning operation immediately after the sewing work.

The second aspect of the present invention resides is providing an apparatus for detecting a magnetic substance in a non-magnetic product, characterized by comprising means for conveying the non-magnetic product, detecting means disposed in the proximity of the conveying means and adapted to detect residual magnetization of the magnetic substance included in the product mentioned above, and means for determining the presence or absence of the magnetic substance in the product based on the information from the detecting means. This apparatus preferably further comprises means for measuring the intensity of the residual magnetization of the magnetic substance detected by the detecting means.

The magnetic substance included in the non-magnetic product may have been preparatorily magnetized as in the case of a sewing needle which has the possibility of being mingled in a sewn product. It may be otherwise magnetized preparatory to the detection by a measure which comprises disposing magnetic field generating means on the upstream side of the detecting means.

In a preferred embodiment, the detecting means comprises a plurality of magnetic sensors arranged at intervals of a prescribed size in a direction substantially perpendicular to the direction of movement of the non-magnetic product.

BRIEF DESCRIPTION OF THE DRAWINGS

Other objects, features, and advantages of the invention will become apparent from the following description taken together with the drawings, in which.

DETAILED DESCRIPTION OF THE PREFERRED EMBODIMENTS

The detection of a magnetic substance in a non-magnetic product according to the present invention is characterized by resorting to the detection of residual magnetization of the magnetic substance which is magnetized in advance.

The relation between the magnetic field H and the magnetic flux density B is expressed by the formula, $B=\mu_0 H$. In the formula, $\mu_0$ stands for the permeability in a vacuum. When a substance is brought into a space of a magnetic field, the magnetic flux induces a magnetic dipole in the substance and magnetizes this substance. Let M stand for the magnetic (dipolar) moment per unit volume of this substance, and the magnetic flux density B will be expressed as $B=\mu_0 H+M$. This symbol M is generally called magnetization. This formula has the magnetic flux density B increased by M as compared with the preceding formula covering the magnetic field in a vacuum. This means an increase of the magnetic flux by the magnetic dipole induced into the substance. Every substance is caused by a magnetic field to induce a magnetic moment. In this sense, it is called a magnetic substance. The magnetic substances are classified into ferromagnetic substances, diamagnetic substances, weakly magnetic substances, etc.

Figure 1:
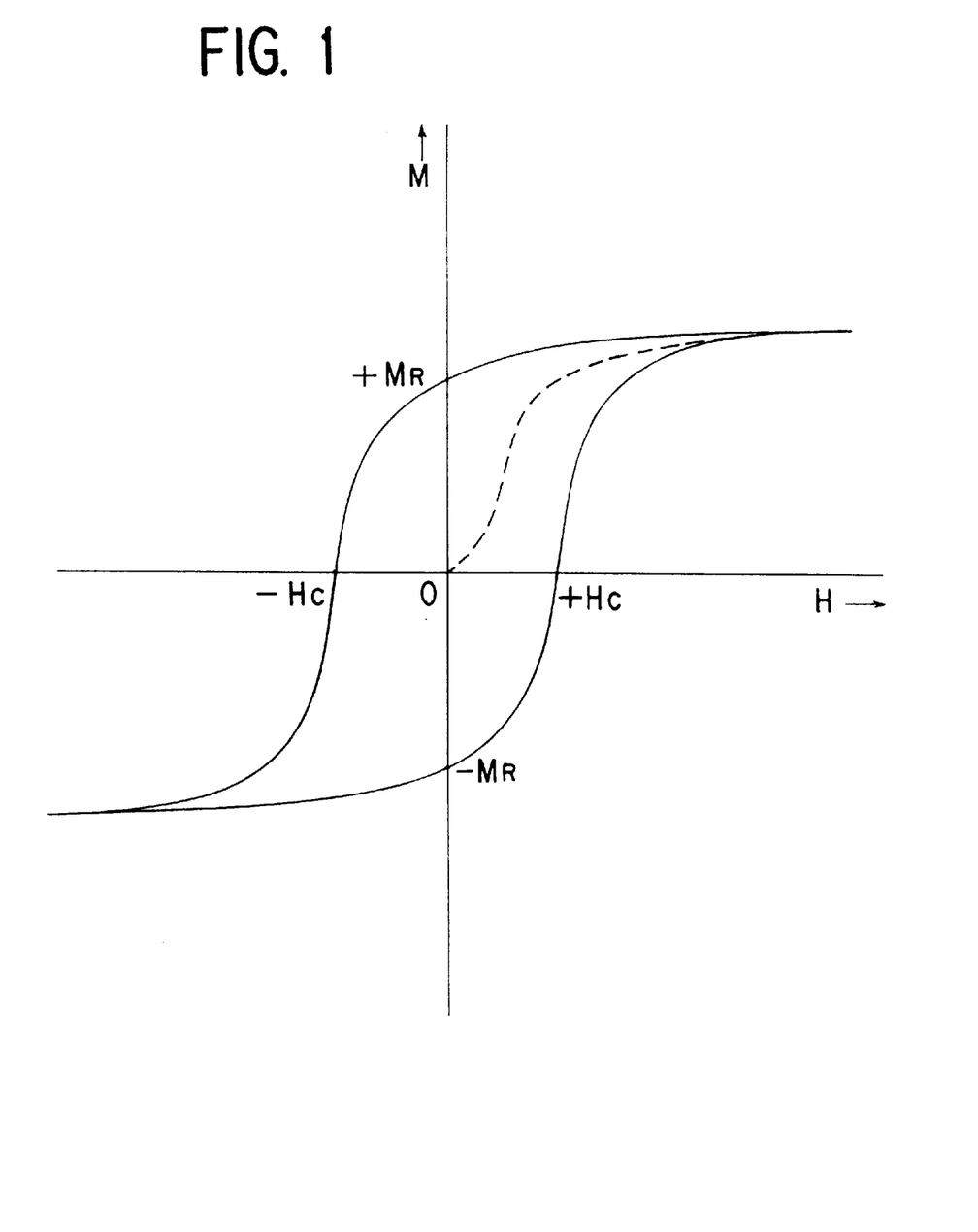
FIG. 1 is a graph showing the hysteresis curve of a ferromagnetic substance.

The magnitude of magnetization differs from one substance to another and varies with change of a magnetic field. In the case of the ferromagnetic substances, the magnitudes of magnetization are generally represented by such a hysteresis curve as shown in FIG. 1. In the diagram, the magnetization $M_R$ which remains after the magnetic field applied is returned to zero constitutes residual magnetization. Then, the magnitude of a magnetic field which is applied in the opposite direction for the purpose of nulling the magnetization constitutes coercive force $H_C$.

A steel material which is the raw material for a needle, for example, is a ferromagnetic substance. When this steel material is magnetized and then deprived of a magnetic field, the residual magnetization $M_R$ shown in FIG. 1 persists in the steel material. Fasteners or sliders made of aluminum or die-cast zinc are weakly magnetic substances and, therefore, retain no residual magnetization. By seeking the residual magnetization, therefore, a missing needle (magnetic substance) mingled with such a non-magnetic product as a sewn product can be exclusively detected without being affected by the presence of a slider and so forth attached to the sewn product. The present invention can be applied to the detection of not only sewing needles but also all magnetic foreign objects exhibiting residual magnetization. Unlike the disturbance of magnetism which is resorted to by the conventional method, the residual magnetization of a magnetic substance which is utilized by the present invention can be detected without reference to the movement of the magnetic substance, i.e. no matter whether the non-magnetic product containing the magnetic substance is in motion or not. The term "non-magnetic" product as used in this specification means a product in which the residual magnetization defined above is not retained.

The non-magnetic products to which the method of the present invention can be applied cover all the non-magnetic products such as woven and/or knit products (woven/knit products), non-woven fabrics, carpets, tatamis (straw matting), foods, medical products, and collections of non-magnetic parts or products in addition to the sewn products mentioned above. Unforeseeable entry of broken needles is dangerous. For the sake of detecting broken needles mingled in sewn products and removing them, the method of the present invention can be advantageously utilized. The woven/knit products have the possibility of unwittingly admitting latch needles. Then, the tatamis and the bedclothes possibly admit such magnetic foreign objects as needles not only during but also after the stage of production. Further, in the case of sliders and top and bottom stops for slide fasteners and such accessorial devices as buttons, buckles, pendants, necktie pins, and watch chains, it is usual to manufacture non-magnetic products made of die-cast zinc or those further having a surface coating formed by the chromating treatment or further by the color clear coating treatment and nickel-plated magnetic products together within one factory. The possibility of the magnetic products mingling in the group of non-magnetic products through inadvertence is undeniable. The method of the present invention can be utilized also when the magnetic products are to be detected in the non-magnetic products and removed therefrom. Further, in the case of non-magnetic sliders, while the sliders are assembled by the incorporation of such parts as pullers, springs, and covers into slider bodies, there arises the possibility that parts made of magnetic substances will be incorporated in the slider assembled. The present invention can be used for the purpose of detecting assembled products which have admitted such magnetic parts through inadvertence during the course of conveyance, for example, and discriminating whether they are non-magnetic assembled products or not. The term "non-magnetic products" as used in the present specification embraces products which, in spite of using magnetic base materials, are prevented from retaining residual magnetization as by a surface treatment.

Now, the present invention will be described specifically below based on embodiments and test examples applied to sewn products with reference to the accompanying drawings.

Figure 2:
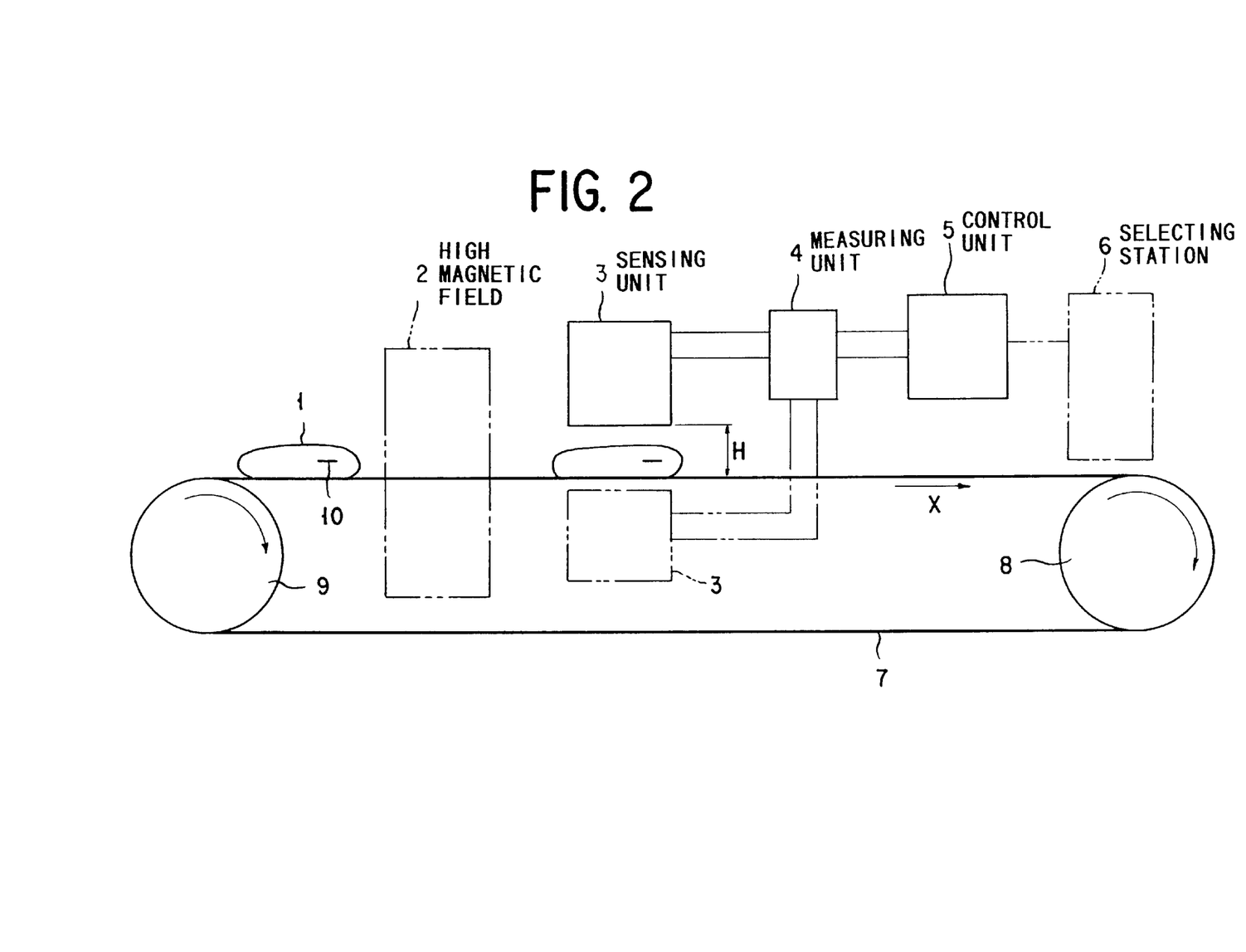
FIG. 2 is a schematic structural diagram illustrating one embodiment of the detecting apparatus of the present invention.

FIG. 2 schematically illustrates the construction of one embodiment of the detecting apparatus of the present invention. As illustrated in FIG. 2, reference numeral 1 denotes a sewn product, 2 a high magnetic field disposed on a path for conveyance of the sewn product 1, 3 a sensing unit disposed on the downstream side of the high magnetic field 2, 4 a measuring unit connected to the sensing unit 3, and 5 a control unit (decision unit) connected to the measuring unit 4.

The sewn product 1 transported at a prescribed speed in the direction of an arrow X by a conveyor 7 (conveying means) stretched over and around a driving roller 8 driven by a drive motor (not shown) and a driven roller 9 first passes through the high magnetic field 2. When the sewn product 1 happens to have admitted a magnetic substance 10 such as a broken needle made of steel (ferromagnetic substance), this magnetic substance 10 is magnetized while passing through the high magnetic field 2. The high magnetic field 2 can be generated by any of the heretofore known magnetic field generating means such as permanent magnet or electromagnet. The magnetization may be effected in a vertical direction (the direction perpendicular to the sewn product) or in the direction of advance of the sewn product.

Figure 3:
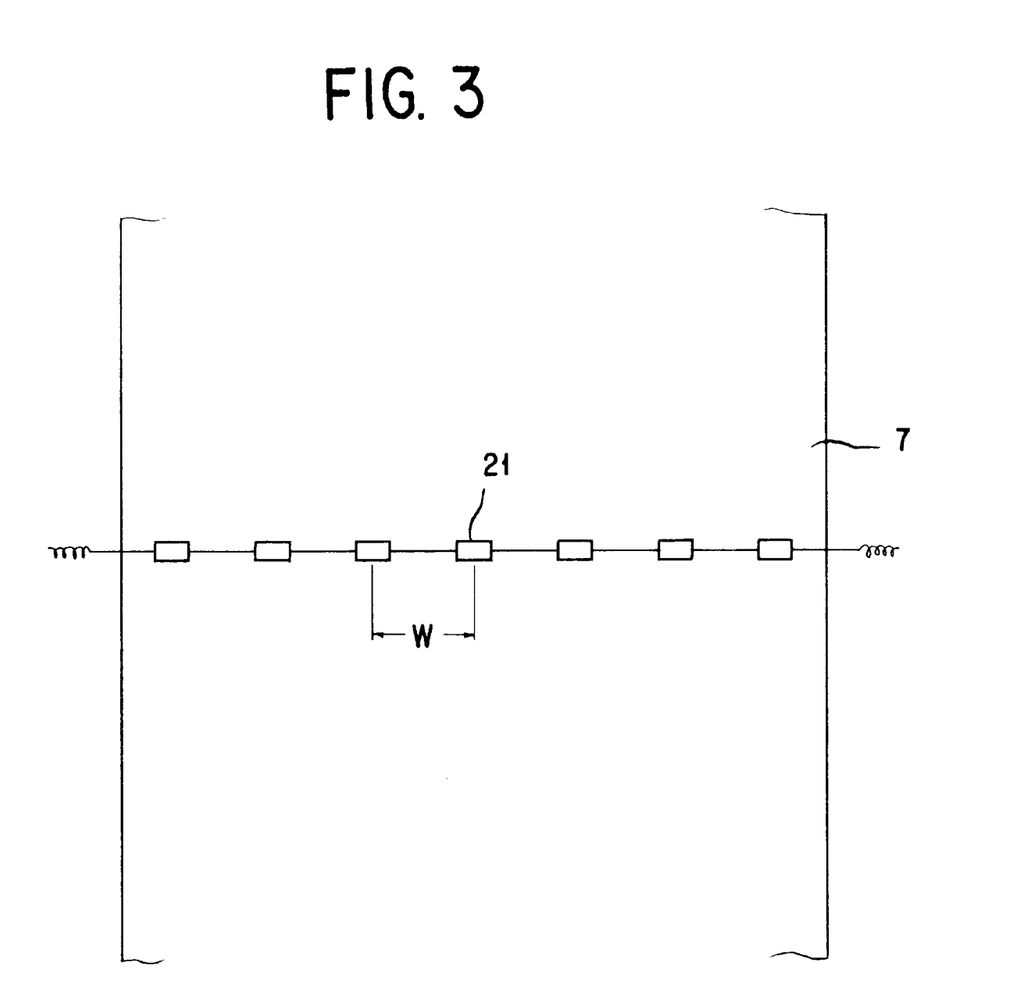
FIG. 3 is a schematic plan view illustrating one example of the layout of magnetic sensors in the apparatus shown in FIG. 2.

The residual magnetization which the magnetized magnetic substance 10 in the sewn product 1 retains after passing the high magnetic field 2 is detected by the sensing unit 3 disposed at a prescribed height H above the conveyor 7. The sensing unit 3 is provided with magnetic sensors such as Hall elements utilizing the Hall effect, MR elements (magnetoresistance elements) utilizing the magnetroresistance effect, a MI effect elements (magnetic impedance effect elements) utilizing the skin effect in the magnetic field, or coils (including coils for detecting a static magnetic field). A plurality of magnetic sensors 21 are disposed as opposed to the sewn product 1 transferred on the conveyor 7 and as spaced at intervals of a prescribed size W in the direction of width of the conveyor 7 as shown in FIG. 3. In consideration of the range of detection of sensor, the magnetic sensors 21 have the height H thereof above the conveyor and the size W of the spaces thereof fixed by the sensitivity of sensor and the S/N ratio where they happen to be Hall elements. This rule holds good for the MR elements, MI elements, or coils. Where the height H is required to be great as when the sewn products under examination are voluminous, the sensing unit 3 may be disposed as vertically opposed across the conveying belt of the conveyor 7 as indicated by a line of alternate one long and two short dashes in FIG. 2. By this setup, the distance between the sensors and the conveyor can be increased.

The signal of detection of the magnetic substance 10 included in the sewn product 1 is emitted as a variation of voltage when the magnetic sensors are Hall elements or coils, as a variation of resistance when they are MR elements, or as a variation of impedance when they are MI effect elements. The signal of detection from the sensing unit 3 is supplied to the measuring unit 4 and measured by a highly sensitive gauss meter, for example. Since the output directly obtained by the highly sensitive gauss meter entrains a power source frequency noise, the measuring device is combined with a hum noise removing circuit and a frequency selecting and amplifying circuit (formed of a low pass and a high pass filter) as auxiliary electronic circuits so that only the part of the amplified signal of detection that falls within a prescribed frequency band is extracted and transmitted to the A/D converter of the control unit 5. The cut-off frequencies of the high pass filter and the low pass filter are decided in accordance with the frequency components of the signal of detection which depend on the speed of the conveyor. The output (voltage output) from the measuring unit 4 (gauss meter) is transmitted to the control unit 5 (decision unit) which is composed of the A/D converter, a sequencer, a CPU (central processing unit), etc. and is utilized for the control of the apparatus. For the prevention of the disturbance by an external noise, differential amplification using a pair of sensors is generally adopted. The use of this method is effective in attaining the prevention under discussion. The addition of a power source noise cut-off frequency selecting and amplifying circuit to the differential amplifying circuit, therefore, serves the purpose of improving the S/N ratio to a greater extent.

The control of the apparatus can be implemented in various modes. The ejection from the transfer line of a sewn product 1 having a magnetic substance 10 mingled therein may be attained, for example, by providing a selecting station 6 on the terminal end side of the conveyor 7 with an ejecting device (not shown), causing the control unit 5, in response to the detection by the sensing unit 3 of the residual magnetization of the magnetic substance 10 in the sewn product 1 and after a delay of a stated duration considerate of the speed of conveyance of the conveyor 7 (the time spent by the conveyance from the sensing unit 3 to the ejecting device), to emit an ejection signal to the ejecting device, and prompting the ejecting device to respond to the ejection signal when the sewn product 1 reaches the position of the ejecting device. Alternatively, the operator posted at the selecting station is enabled to know the presence of the magnetic substance in the sewn product 1 forwarded to him by providing the selecting station 6 with a display lamp or a sound generator and causing the control unit 5, in response to the detection of the residual magnetization of the magnetic substance 10 in the sewn product 1 and after a delay of a stated time, to emit a signal to the display lamp or the sound generator and turn on the display lamp or the sound generator. The necessity for providing a plurality of gauss meters is obviated by causing a plurality of sensors to perform a scanning operation. Further, the position of a magnetic substance, for example, in the Y direction, i.e. the direction of arrangement of sensors can be determined when such arrangement is capable of telling which sensors have effected required detection at a given time. When an encoder is provided on the rotating shaft of the conveyor, the position of a magnetic substance in the X direction, i.e. the direction of advance can be determined. The determination of such a position permits the detection of a magnetic substance at that position to be attained with ease. At times, even the removal of the magnetic substance can be realized.

Figure 4:
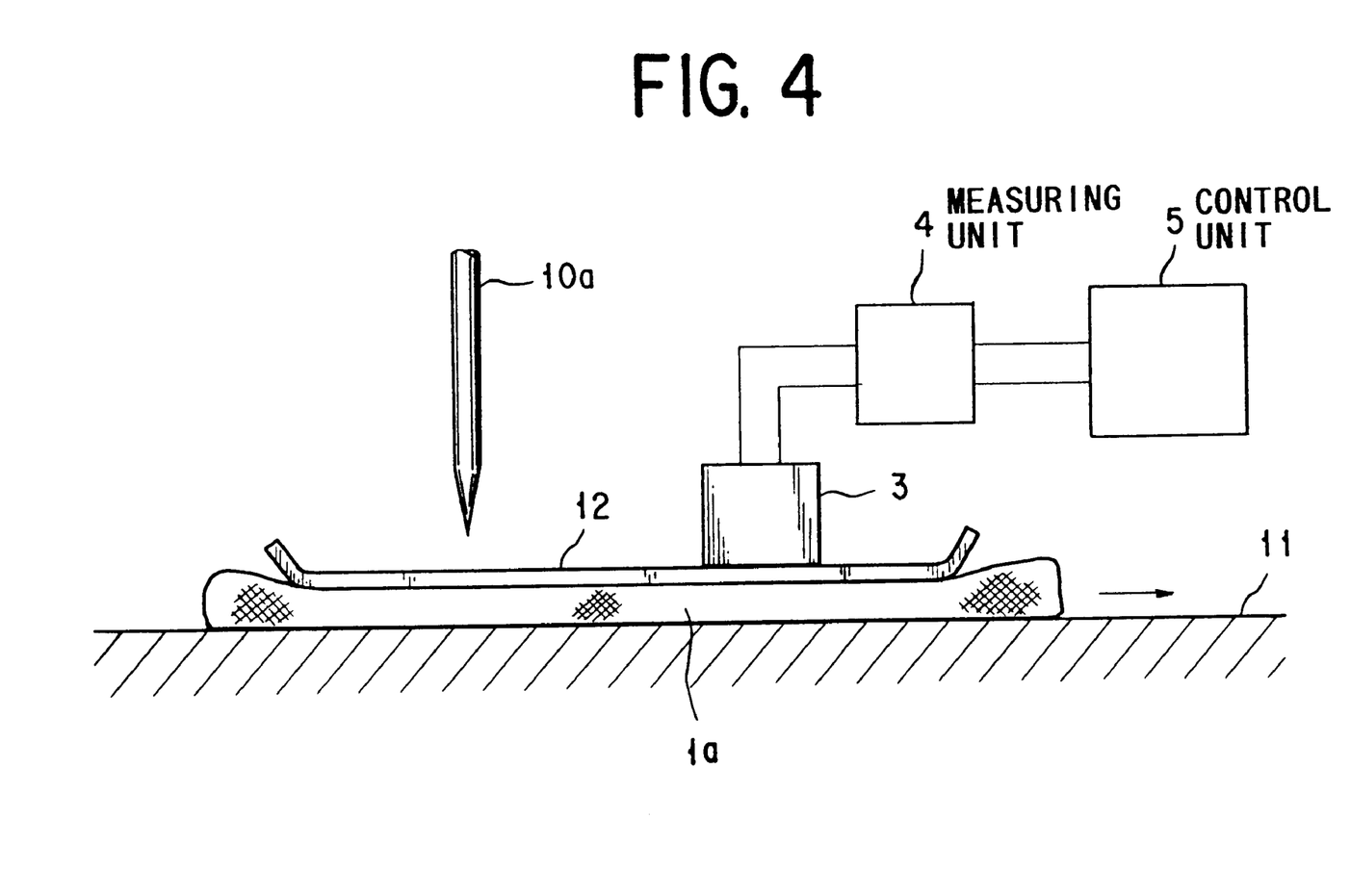
FIG. 4 is a schematic structural diagram illustrating another embodiment of the detecting apparatus of the present invention.

FIG. 4 schematically illustrates another embodiment of the detecting apparatus of the present invention. This apparatus allows the detection of residual magnetization of a magnetic substance to be effected immediately after the step of sewing.

A sewn product 1a laid on a rotary table 11 which is transferring means is guided by a sewing machine guide 12 and meanwhile sewn by a preparatorily magnetized needle 10a (magnetic substance). When the needle 10a is broken and mingled in the sewn product 1a, the residual magnetization of the broken needle is immediately detected by a sensing unit 3 disposed on the guide 12 and the signal of detection emitted from the sensing unit 3 is transmitted to a measuring unit 4. The signal of measurement emitted from the measuring unit 4 is outputted to a control unit 5. The control unit 5, after a delay of a stated time, transmits an ejection signal to an ejecting device (not shown) disposed at a stated position on the rotary table 11, for example. Consequently, the ejecting device is actuated so as to eject from the transfer line the sewn product 1a having the broken needle included therein.

The apparatus so constructed as illustrated in FIG. 4 enjoys such advantages as allowing a sewn product fresh from the step of sewing to be scanned to detect the presence or absence of a broken needle included therein, permitting a decrease in the number of component magnetic sensors and a decrease in the distance between the sewn product and the sensing unit, and consequently permitting the detection of the presence or absence of a magnetic substance to be attained with improved sensitivity.

Various ferromagnetic substances can be adopted as the material for the preparatorily magnetized needle 10a to be used in the embodiment mentioned above. Ideally, the needle is formed as a permanent magnet. Since needles of permanent magnet generally are not easy to manufacture, materials obtained by combining Fe with C, B, N, etc. and enabled to generate large residual magnetization are properly adopted and alloy materials of the Fe—Al, Mn system, Fe—Cr, Co, Ni system, etc. are used advantageously. The needle illustrated in FIG. 4 has the possibility of succumbing to the influence of heat and strain and consequently suffering the coercive force thereof to be varied while in use. It is, therefore, proper to interpose a high magnetic field between the needle and the sensing unit as illustrated in FIG. 2.

TEST EXAMPLE 1

Figure 6:
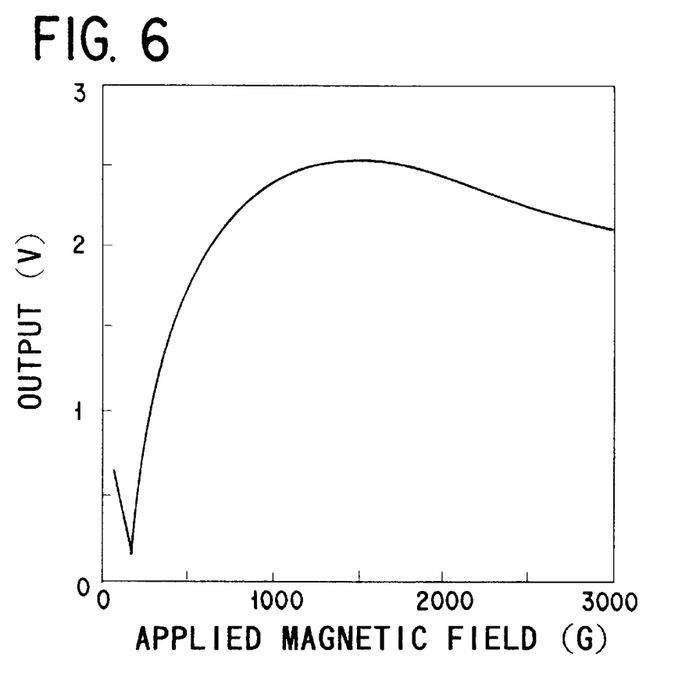
FIG. 6 is a graph showing the relation between the intensity of a magnetic field applied to a broken needle and the output of magnetic sensors (Hall elements) observed in Test Example 1.
Figure 7:
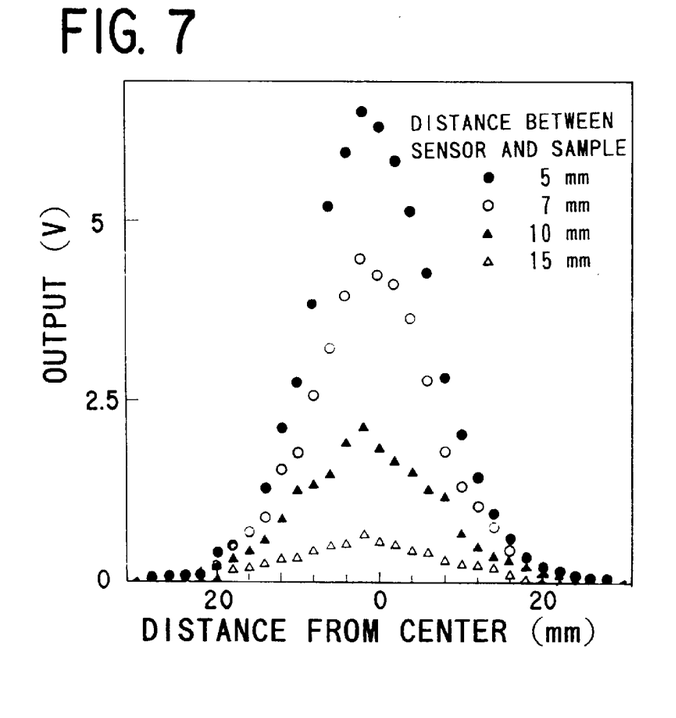
FIG. 7 is a graph showing the relation between the distance of a broken needle from the center in the direction of movement thereof and the output of magnetic sensors (Hall elements) observed in Test Example 1.

A broken tip of a sewing needle was used as a sample and measured for residual magnetization by the use of a Hall element as a magnetic sensor. Typical results of this test are shown in FIG. 6 and FIG. 7.

The magnetization of the broken needle sample (43 mg) was effected by attaching the sample fast to the leading end of an aluminum rod (which was used because it avoids being magnetized when placed in a magnetic field) with a doubled-face adhesive tape and placing the aluminum rod in a magnetic field generated by a bitter type electromagnet. The sample was magnetized perpendicularly to the direction of the magnetic field, with the needle tip parallelled to the direction of magnetization.

Figure 5:
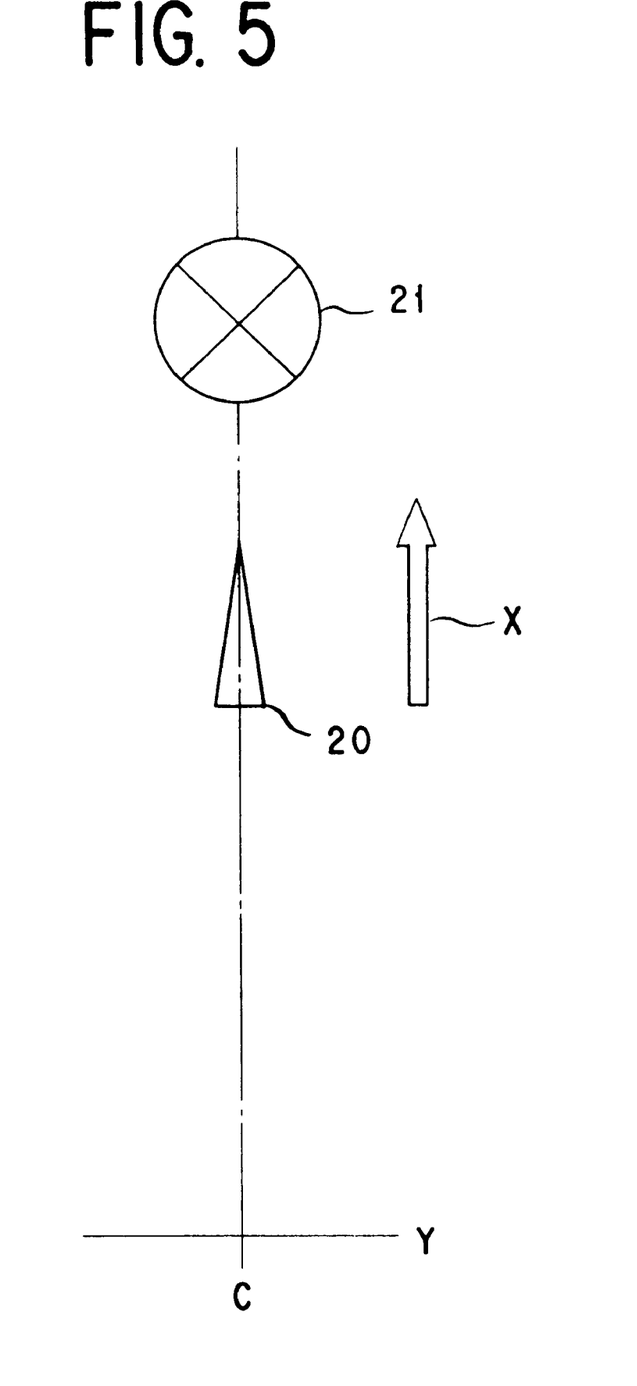
FIG. 5 is a model diagram illustrating the relation between the position of magnetic sensors and the direction of movement of a broken needle in the measurement of the residual magnetization of the broken needle.

Then, the magnetized broken needle sample 20 was set in place on a rotary table with the tip thereof pointing in the direction X of movement as illustrated in FIG. 5 and it was passed directly under the sensor 21 with the leading end of the sensor 21 separated by a distance of 10 mm from the sample. By the magnetic field having the intensity thereof varied between 74 G and 3000 G, the sample was remagnetized in the direction opposite the direction of magnetization while measuring the intensity of the applied magnetic field and the magnitude of the residual magnetization (displayed by the output voltage). The results of this test are shown in FIG. 6. The signal of detection emitted by the Hall element used as the sensor was measured by a highly sensitive gauss meter and the voltage output from the gauss meter was passed through a hum noise removing filter and a frequency selecting and amplifying circuit having an amplifying ratio of 2500% and printed out by a memory coder. As shown in FIG. 6, the detection output (V) of residual magnetization decreased in accordance as the intensity of the applied magnetic field was increased and the output substantially reached zero when the detection output rose to the neighborhood of 180 G. Thereafter, the output increased in proportion as the intensity of the applied magnetic field grew and the output levelled off when the intensity nearly surpassed 1000 G. From the results, it is inferred that the intensity of magnetization in the neighborhood of 180 G in which the output substantially reached zero was equivalent to the coercive force. In view of these results, it is preferable that the intensity of the magnetic field applied to the magnetic substance should be such an extent that it reaches the state of saturation at a level exceeding about 1000 G.

Subsequently, the relation of the detection output of the residual magnetization of the needle with the distance between the sensor and the sample was investigated for the purpose of determining the range in which the sample could be detected by the sensor (Hall element). The sensor used herein was given a small size to ensure accurate determination of distribution to the fullest possible extent.

The broken needle sample 20 was magnetized with 1400 G and the measurement was carried out, with the needle tip pointing in the same direction as the direction X of movement indicated by the mark of an empty arrow in FIG. 5 and the sample set at a position varied to the left and the right from the center C directly below the sensor 21 at intervals of 2 mm to a total distance of 30 mm and the distance between the sensor 21 and the sample 20 directly thereunder varied to 5, 7, 10, and 15 mm. The output of measurement depended on the degree of amplification of the amplifier. One example of this measurement is illustrated in FIG. 7.

Broken needle samples severally weighing 36 mg, 40 mg, and 42 mg were tested in the same manner as described above. Though the outputs of these samples slightly varied as a whole in proportion to the weights of samples, the curves describing the results of test obtained of the samples were similar to the curves of FIG. 7.

The results shown in FIG. 7 indicate that the output decreased in accordance as the distance between the sensor and the sample increased and the output increased in proportion as the distance to directly below the sensor (center) decreased. In the present example of measurement, virtually no output was obtained when the lateral distance surpassed 20 mm.

From the results described above, it is considered that when a plurality of Hall elements are arrayed as magnetic sensors, their intervals are required to be limited to 2×1.5 cm or less. The number of Hall elements necessary for the purpose of measurement, however, can be decreased by increasing the size of element. This thought may apply to the case using a plurality of MR elements similarly arrayed. When MR elements of a length of 10 cm are used, the number of sensors can be further decreased.

From the results given above, it is noted that when a plurality of magnetic sensors are arrayed in a horizontal direction perpendicular to the direction X of movement of a sewn product having a magnetic substance (needle) mingled therein, they not merely detects the presence or the absence of a magnetic substance (needle) in the sewn product but also detects the position of the magnetic substance (needle) in the sewn product through an arithmetic operation performed by a CPU on the basis of the outputs of the individual magnetic sensors and the speed of travel of the sewn product.

TEST EXAMPLE 2

Figure 8:
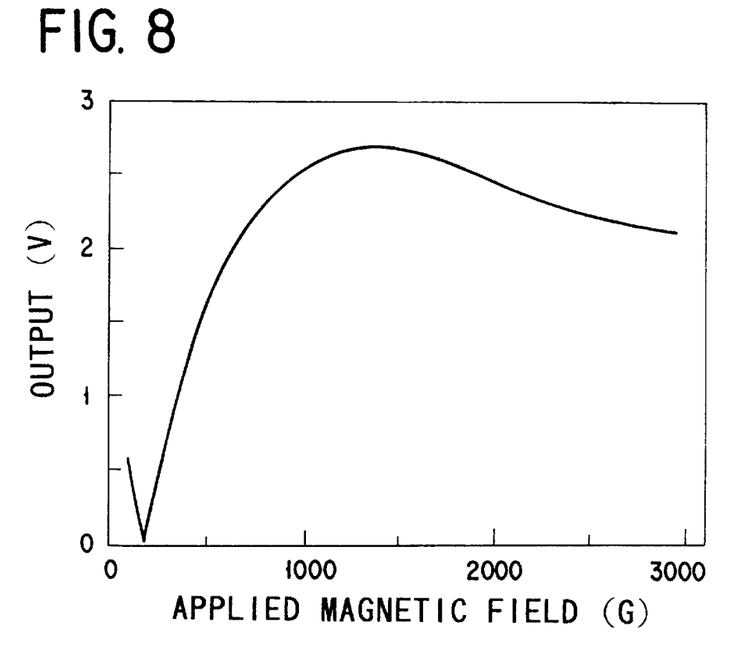
FIG. 8 is a graph showing the relation between the intensity of a magnetic field applied to a broken needle and the output of magnetic sensors (minute coils) observed in Test Example 2.

A broken tip of a sewing needle was adopted as a sample and was measured for residual magnetization by the use of minute coils (coverage: from DC to 100 kHz) as magnetic sensors. Typical results of the measurement are shown in FIG. 8 and FIG. 9.

The test was performed in the same manner as in Test Example 1 described above. The broken needle sample (43 mg) magnetized preparatorily to about 1.2 kG was remagnetized in a direction opposite the direction of magnetization with a magnetic field having the intensity thereof varied between 74 G and 3000 G while measuring the intensity of the applied magnetic field and the magnitude of the residual magnetization (displayed by output voltage). The results are shown in FIG. 8. The measurement was carried out by the use of a differential amplification type highly sensitive gauss meter incorporating a minute coil as a sensor therein. The voltage output from the gauss meter was passed through a hum noise removing filter and a frequency selecting and amplifying circuit having an amplification ratio of 2500% and printed out by a memory coder. The results shown in FIG. 8 indicate that the detection output (V) of the residual magnetization decreased in proportion as the intensity of the applied magnetic field grew and that the output substantially decreased to zero when the intensity reached the neighborhood of 180 G. Thereafter, the output reached the state of saturation as the intensity of the applied magnetic field further grew. The results support a conclusion that the intensity of the applied magnetic field for causing extinction of the residual magnetization existed in the neighborhood of 180 G and that this intensity of the magnetic field was equivalent to the coercive force.

Then, the relation of the detection output of the residual magnetization of the needle with the distance between the sensor and the sample was investigated. The results are shown in FIG. 9.

Figure 9:
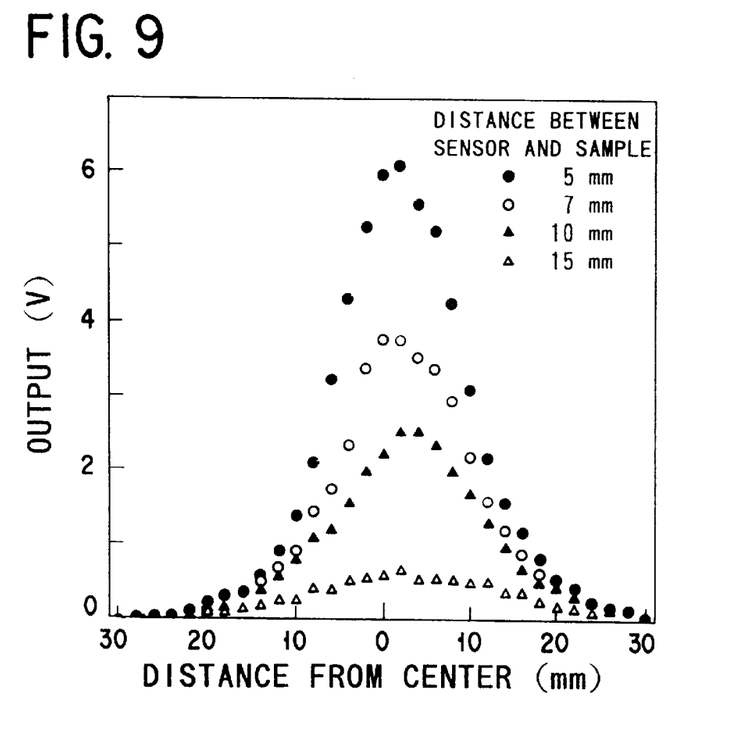
FIG. 9 is a graph showing the relation between the distance of a broken needle from the center in the direction of movement thereof and the output of magnetic sensors (minute coils) observed in Test Example 2.

When a broken needle sample weighing 36 mg was similarly tested, the curves describing the results of test were similar to those of FIG. 9, though the output was slightly lowered as a whole. Even when the sample has a small weight and the output is consequently low as in the present case, the detection output can be further increased by exalting the degree of amplification by the method described above.

While certain specific embodiments and test examples have been disclosed herein, the invention may be embodied in other specific forms without departing from the spirit or essential characteristics thereof. The described embodiments and examples are therefore to be considered in all respects as illustrative and not restrictive, the scope of the invention being indicated by the appended claims rather than by the foregoing description and all changes which come within the meaning and range of equivalency of the claims are, therefore, intended to be embraced therein.

The entire disclosure of Japanese Patent Application No. 9-60182 filed on Feb. 28, 1997 including specification, claims, drawings and abstract are incorporated herein by reference in its entirety.

What is claimed is:

1. A method for detecting a magnetizable sewing needle included in a non-magnetic sewn product, comprising the steps of:

applying a magnetic field to said product having a magnetic field intensity greater than or equal to that required to impart a saturated magnetization to the sewing needle, then detecting residual magnetization of any said sewing needle included in said product, and judging the presence or absence of said sewing needle in said product based on the detected residual magnetization.

2. The method according to claim 1, wherein the residual magnetization of said sewing needle is detected, while said sewn product is in motion, by a plurality of magnetic sensors disposed as opposed across a prescribed distance to said product in motion and arranged at intervals of a fixed size in a direction substantially perpendicular to the direction of movement of said sewn product.

3. The method according to claim 1, wherein said sewn product is a woven and/or knit product.

4. A method for detecting a magnetizable sewing needle included in a non-magnetic sewn product, comprising the steps of:

preparatorily applying a magnetic field to a magnetizable sewing needle said magnetic field having a magnetic field intensity greater than or equal to that required to impart a saturated magnetization to the sewing needle, thereby causing said sewing needle to assume a state of possessing residual magnetization, preparing a non-magnetic sewn product by using said magnetized sewing needle, then detecting residual magnetization of any said sewing needle erroneously included in said product, and judging the presence or absence of said sewing needle in said product based on the detected residual magnetization.

5. The method according to claim 4, wherein the residual magnetization of said sewing needle is detected, while said sewn product is in motion, by a plurality of magnetic sensors disposed as opposed across a prescribed distance to said product in motion and arranged at intervals of a fixed size in a direction substantially perpendicular to the direction of movement of said sewn product.

6. The method according to claim 4, wherein said sewn product is a woven and/or knit product.

7. The method according to claim 4, wherein the residual magnetization of said needle if any in said sewn product is detected immediately after a step for sewing the product.

8. An apparatus for the detection of a sewing needle in a sewn product, comprising:

a conveyor conveying said sewn product, a magnetic field generator positioned to apply to said sewn product on said conveyor a magnetic field having a magnetic field intensity greater than or equal to that required to impart a saturated magnetization to any of a magnetizable sewing needle present in the sewn product, a magnetic detector disposed on the downstream side of said magnetic field generator and adjacent said conveyor and adapted to detect residual magnetization of any said sewing needle included in said sewn product, said magnetic detector comprising a plurality of magnetic sensors arranged as spaced with a prescribed distance in a direction substantially perpendicular to the direction of movement of said sewn product, and an analyzer for determining the presence or absence of said sewing needle in said sewn product based on information received from said magnetic detector.

9. The apparatus according to claim 8, which further comprises a measurer measuring the intensity of residual magnetization of said sewing needle detected by said magnetic detector.

10. The apparatus according to claim 8, wherein said magnetic sensor is selected from the group consisting of Hull element, a magnetoresistance element, a magnetic impedance effect element, and a coil.

* * * * *